Dec. 23, 1941.  A. H. CHENOWETH  2,266,957
OVEN
Filed March 29, 1940    2 Sheets-Sheet 1

Avery H. Chenoweth,
INVENTOR

BY Victor J. Evans & Co.
ATTORNEYS

Dec. 23, 1941.　　　A. H. CHENOWETH　　　2,266,957
OVEN
Filed March 29, 1940　　　2 Sheets-Sheet 2
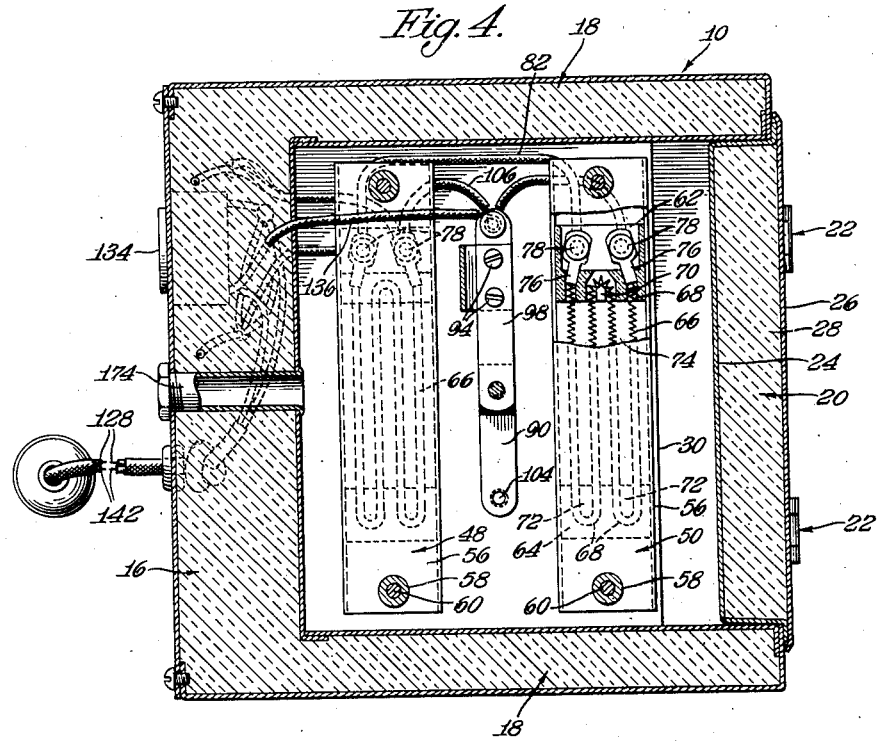
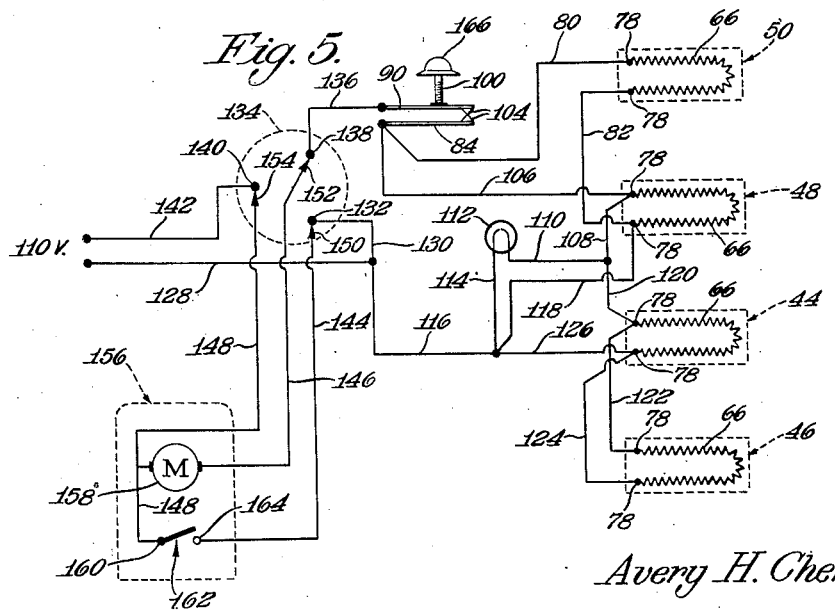
Avery H. Chenoweth.
INVENTOR
BY Victor J. Evans & Co.
ATTORNEYS Patented Dec. 23, 1941

2,266,957

UNITED STATES PATENT OFFICE 2,266,957

OVEN

Avery H. Chenoweth, Mason City, Ill.

Application March 29, 1940, Serial No. 326,808

14 Claims. (Cl. 219—35)

My invention relates to artificial dentures, and has among its objects and advantages the provision of an improved dry heat method of and oven for curing such dentures.

At the present time, many recently developed types of synthetic resinous materials are being used in the making of dentures, such as, acrylic (sold under the trade name Crystolex), and phenol formaldehyde resin (sold under the trade name Luxene 37). Such denture materials are extremely light in weight, durable, and dense so as to be characterized by relatively low moisture absorption properties. Dentures formed of such materials are exceptionally attractive in color and texture, with the color simulating natural oral tissue. While the properties of such denture materials are entirely satisfactory so far as strength, color, density and lightness in weight are concerned, considerable difficulty has been experienced in the matter of curing dentures made therefrom.

Many systems have been devised for the curing of artificial dentures, particularly with respect to heat application. Steam has been employed quite generally, while dry heat methods have been attempted with little success. Because of the peculiar properties of denture materials of the above mentioned type, dry heat curing has many advantages over the steam methods. In curing dentures, the temperature must be accurately controlled, but the problem of moisture elimination, so far as direct contact between the moisture and the denture is concerned, is equally important.

It is common practice to employ tin foil for the purpose of shielding the denture from contact with moisture during the curing process. Any break in the tin foil which permits moisture contact results in discoloration of the denture, such as the formation of white spots, and a good bond between the teeth and the plate can be had only through proper elimination of moisture. Tin foiling is a tedious and time consuming job, and it frequently happens that the tin foil assumes a wrinkled condition which leaves grooves and surface irregularities in the denture. Then, too, the tin foil covering prevents the plate structure from conforming in size and shape exactly to the mold.

Accordingly, an object of my invention is to provide novel means for dry heat curing of dentures without the use of tin foil, in which the dentures may be accurately formed to size and shape, and in which a perfect bond may be secured between the teeth and the plate, as well as uniform coloration.

More specifically, I provide a curing oven having a relatively thick metal plate which supports the flask, with the plate located above a heating element inside the oven. A relatively thick metal plate is positioned on the top of the flask and is located underneath a second heating element inside the oven. The flask bottom and top are flat and of large areas for close fitting engagement with large areas of their respective plates, so that the flask will be effectively heated by conduction. The two heating elements are wired to a thermostat and a time controlled switch so that the temperature of the plates may be accurately controlled, with the time controlled switch acting to eliminate the necessity of personal attention. The metal plates are heated by radiation and are interposed between the flask and the two heating elements. I have found that such a plate system operates to heat the flask efficiently and maintain a uniform temperature condition, with the dry heat system resulting in perfect dentures without the aid of tin foiling.

In practice, the denture cast or mold is positioned in the bottom section of the flask, with the section previously provided with the usual plaster of Paris or other material common in the art. The plaster is permitted to set and is treated with a separating fluid in the usual manner. The upper section is then placed in position on the lower section and a creamy mixture of plaster of Paris is poured into the upper flask section, after which the cover is placed on the upper section. The flask is then set aside to permit the plaster of Paris to harden.

After the plaster of Paris has set, the flask is placed in the oven and heated until the wax in which the teeth are set is soft and can be removed from the mold. At this time all the teeth are removed from the mold and kept in their proper arrangement, and any remaining wax in the mold is removed. The flask sections are placed in an oven for dehydration purposes. I have found that subjecting the flask sections to a temperature of 300° F. for a period of approximately two hours is sufficient for proper dehydration thereof. However, the flask sections are separated for dehydration purposes, and proper dehydration does not depend upon the two-plate feature employed in the dry heat curing stage.

After dehydration, the flask sections are permitted to cool for a few minutes and the plaster, with the exception of the areas occupied by the teeth, is painted with a coating of suitable varnish in the usual manner. The teeth are then placed in position and the flask sections again placed in the oven for approximately ten minutes at a temperature of about 215° F. The sections are separated in the oven and when removed, the section of the flask containing the teeth is provided with the required amount of denture material around the teeth and completely filling the mold. As the denture material assumes a semi-liquid condition, the other section of the flask is removed from the oven and placed in position on a companion flask section. The sections are then pressed together and latched, after which the latched flask is placed in the oven for curing purposes. During the heat curing, the two metal plates are employed, as previously mentioned, and the thermostat is set for the temperature required for the particular type of denture material being used. Such temperatures vary with respect to different materials and are designated by the manufacturers of the respective materials. After the curing stage, the flask is permitted to cool and the trimming, filing and polishing of the denture are done in the customary manner.

In the accompanying drawings:

Figure 4 is a sectional view taken substantially along the line 4—4 of Figure 1; and Figure 5 is a diagrammatic view of the electric circuit.

Figure 1:
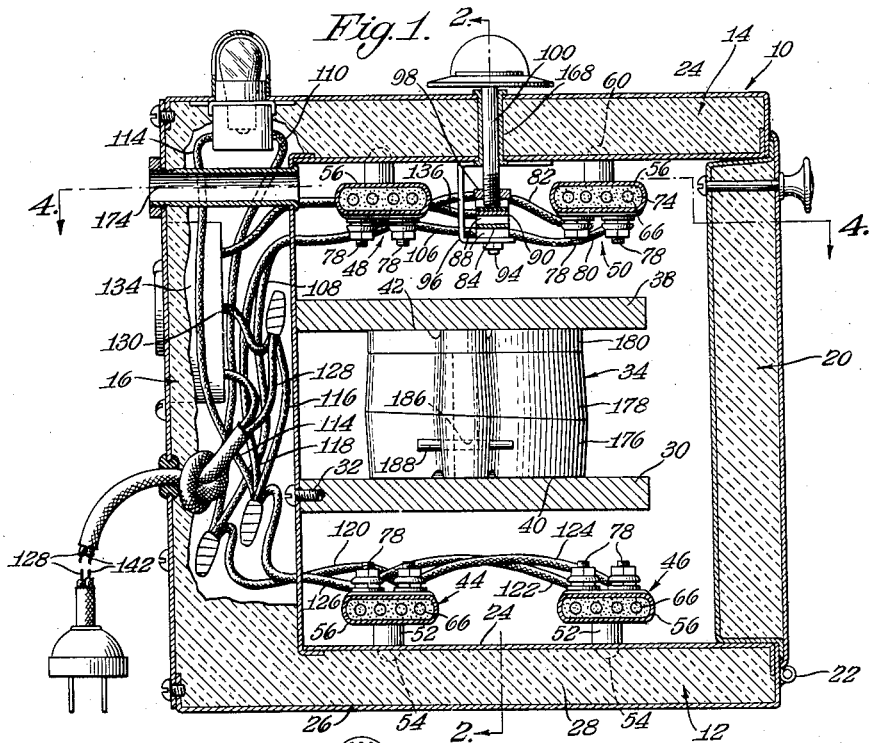
Figure 1 is a sectional view of an oven in accordance with my invention.

In the embodiment selected to illustrate my invention, the oven 10 comprises a bottom wall 12, a top wall 14, a rear wall 16 and side walls 18. The front of the oven is open and is normally closed by a door 20 hingedly connected at 22 with the bottom wall 12.

All the walls and the door are identical in construction and each comprises an inner metallic plate 24 spaced from an outer metallic plate 26, with the space between the plates filled with insulating material 28. Rear wall 16 is slightly thicker than the other walls of the oven to provide accommodation for the wiring of the heating elements.

To one of the inner plates 24 I fixedly secure a relatively thick metal plate 30 through the medium of screws 32, which plate serves as a shelf for the dental flask 34. Plate 30 extends the full width of the oven chamber 36 but terminates slightly short of the door 20, see Figs. 2 and 1. Upon the flask 34 I position a relatively heavy metallic plate 38, which plate is of the same size and configuration as the plate 30, the only difference being that plate 30 is permanently secured in a fixed position while the plate 38 is free and may be removed from the chamber 36 to facilitate placement and removal of the flask 34. The flask has a flat bottom 40 resting on the plate 30 and a flat top 42 on which the plate 38 rests.

Beneath the plate 30 I mount two heating units 44 and 46, which are identical in construction and operation, and two such heating units 48 and 50 are mounted above the plate 38. Units 44 and 46 are fixedly secured to the plate 24 of the bottom wall 12 through the medium of spacing sleeves 52, and bolts 54 extend through the sleeves 52, the plate 24 and the metallic sheaths 56 of their respective heating units 44 and 46 for fixedly securing the latter in spaced relation with the plate 24. Similarly, the heating units 48 and 50 are fixedly secured to the plate 24 of the top wall 14 through the medium of sleeves 58 and bolts 60. Heating units 48 and 50 also include metallic sheaths 56.

Referring to Fig. 4, the heating unit 50 is illustrated partly in section and includes insulator bodies 62 and 64 which support a resistance conductor 66 running back and forth between the bodies. The bodies are grooved at 68 for housing the ends of the different lengths of the resistance, and the body 62 has a lug 70 and the body 64 has two such lugs 72 about which the resistance is looped. Sheath 56 is filled with suitable heat refractory insulating material 74. The ends of the resistance 66 are connected with terminals 76 provided with terminal screws 78 to respectively connect the terminals with wires 80 and 82. All the heating units 44 to 50 are identical in construction.

Figure 2:
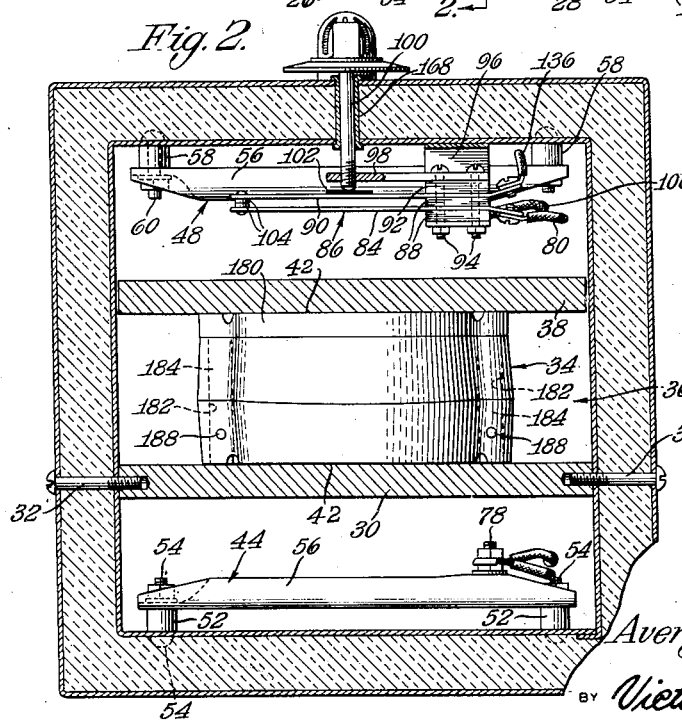
Figure 2 is a sectional view taken substantially along the line 2—2 of Figure 1, with the flask illustrated in elevation.

Wire 80 is connected with a bimetallic strap 84 of a thermostat 86 and is secured between insulating blocks 88, see Fig. 2. The thermostat includes a second metallic strap 90 secured between one of the insulating blocks 88 and an insulating block 92, with the blocks 88 and 92 and the two straps 84 and 90 clamped into a unitary structure by bolts 94 anchored to a bracket 96 which is welded to the plate 24 of the top wall 14. Bolts 94 clamp an arm 98 against the blocks 92, and an adjusting screw 100 is threaded into the arm 98 and engages an insulating pad 102 mounted on the strap 90. Straps 84 and 90 are respectively provided with contact points 104. Strap 90 may be adjusted relatively to the strap 84 through adjustment of the screw 100.

Wire 82 is connected with one terminal screw 78 of the resistance 66 in the heating unit 48, best illustrated in Fig. 5. The other terminal screw 78 of the heating unit 48 is connected with the strap 84 through the medium of a wire 106. The terminal screw 78 connected with the wire 106 is connected with a wire 108 connected with a wire 110 leading to a pilot lamp 112. Lamp 112 is connected with a wire 114 connected with a wire 116, which wire is connected with a wire 118 connected with the terminal 78 of the heating unit 48 connected with the wire 82. A wire 120 is connected with the wires 108 and 110 and with one of the terminals 78 of the resistance 66 in the heating unit 44, and this terminal is connected with a wire 122 connected with the terminal 78 of the resistance 66 in the heating unit 46. The second terminal 78 of the heating unit 44 is connected with a wire 124 connected with the second terminal 78 of the heating unit 46. The terminal 78 of the heating unit 44 connected with the wire 124 is connected with a wire 126 which is also connected with the wires 114, 116 and 118.

A line wire 128 is connected with the wire 116 as well as a wire 130 connected with a terminal 132 of a three-terminal receptacle 134 secured to the plate 26 of the rear wall 16. A wire 136 electrically connects the strap 90 with the second terminal 138 of the receptacle 134, and the third terminal 140 of the receptacle is electrically connected with the second line wire 142. Three wires 144, 146 and 148 are respectively provided with prongs 150, 152 and 154 for engagement with the terminals 132, 138 and 140, respectively. The three wires 144, 146 and 148 may be incorporated in a single cord for connection with an electric clock or timing device 156. Such clocks are old and well known in the art and need not be described in detail. Suffice it to say that the clock includes a motor 158 electrically connected with the wires 146 and 148, with the latter wire connected with a terminal 160 of the clock actuated switch 162. The wire 144 is connected with the second terminal 164 of the switch 162.

Wire 136 connected with the strap 90 is electrically connected with the line wire 142 through the medium of the terminal 138, prong 152, wire 146, motor 158, wire 148, prong 154 and terminal 140. Fig. 5 illustrates one terminal 78 in each of the heating units 44 to 50 as being electrically connected with the bimetallic strap 84. The second terminals of all the heating units are connected with the wire 116 which is connected with the line wire 128. Thus, when the prongs 150, 152 and 154 are pressed into the socket 134, and the switch 162 is closed, the clock may be set to maintain the switch 162 closed for a predetermined length of time and the pilot lamp 112 indicates a closed circuit through the resistances 66. During operation, the temperature of the heating units 44 to 50 is controlled through the medium of the thermostat 86. Strap 90 may be adjusted to cause separation of the contacts 104 upon predetermined bending of the strap 84.

Figure 3:
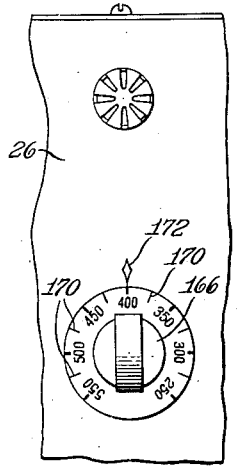
Figure 3 is a detail view of the thermostat control.

A knob 166 is secured to the screw 100, and the screw is rotatably mounted in a sleeve 168 in the top wall 14. Fig. 3 illustrates the knob 166 as being provided with graduations 170 for indicating different temperature positions of the knob when rotated about the axis of the shaft 100. The plate 26 of the top wall 14 is provided with a pointer 172 to which the different graduations may be adjusted.

Wall 16 is provided with a tube 174 which places the chamber 36 in communication with the atmosphere. Tube 174 may be closed by inserting a plug therein during the heat curing stage. However, in cases where the flask sections are being dehydrated, the plug is removed to vent the moisture to the atmosphere.

Flask 34 is illustrated as comprising sections 176 and 178, with a cover 180 fitting on the section 178. Sections 176 and 178 are provided with bores 182 within which pins 184 fixedly connected with the cover 180 are slidably receivable. Flask section 176 and the pins 184 are provided with transverse openings 186 for the reception of pins 188 which secure the pins 184 against retraction so that the flask sections and the cover are effectively connected into a unitary structure for heat treating purposes. The manner in which the flask sections and the cover are latched eliminates the necessity of a press inside the oven, and the plate 38 may be laid on the flask so that the latter constitutes a support for the plate. Accordingly, I eliminate the necessity of special mountings for the plate 38 and the weight of the plate is utilized for bringing the plate into effective pressure relation with the flat face 42.

Having thus described certain embodiments of my invention in detail, it is, of course, understood that I do not desire to limit the scope thereof to the exact details set forth except insofar as those details may be defined in the appended claims.

I claim:

1. In combination with a dental flask, a heating chamber for containing the dental flask, a heat conduction shelf inside the chamber for supporting the dental flask, a free heat conduction plate adapted to lie at rest on the dental flask, and heat radiating means for said shelf and plate.

2. In combination with a dental flask, a heating chamber for containing the dental flask, a heat conduction shelf inside the chamber for supporting the dental flask, a free heat conduction plate adapted to lie at rest on the dental flask, and a plurality of heat radiating means for said shelf and said plate.

3. In combination with a dental flask, a heating chamber for containing the dental flask, a heat conduction shelf inside the chamber for supporting the dental flask, a heat conduction means adapted to lie at rest on the dental flask, and heat radiating means for said shelf and means.

4. In combination with a dental flask, a heating chamber for containing the dental flask, a heat conduction shelf inside the chamber for supporting the dental flask, a heat conduction means adapted to lie at rest on the dental flask, and means for heating said shelf and means.

5. In combination with a dental flask, a heating chamber for containing the dental flask, a heat conduction shelf inside the chamber for supporting the dental flask, a heat conduction plate engaging the top of the dental flask, and means for heating said shelf and plate.

6. In combination with a dental flask, an oven for containing the dental flask, a heat conduction shelf inside the oven for supporting the dental flask, a heat conduction plate engaging the top of the flask, and heat radiating means for said shelf and said plate, said heat radiating means lying beneath said shelf and above said plate.

7. In combination with a dental flask, an oven for containing the dental flask, a heat conduction shelf inside the oven for supporting the dental flask, a heat conduction plate engaging the top of the flask, heat radiating means for said shelf and said plate, said heat radiating means lying beneath said shelf and above said plate, said heat radiating means comprising electrical resistances, an electric circuit for supplying current to said resistances, and a thermostat interposed in said electric circuit.

8. In combination with a dental flask, an oven for containing the dental flask, a heat conduction shelf inside the oven for supporting the dental flask, a heat conduction plate engaging the top of the flask, heat radiating means for said shelf and said plate, said heat radiating means lying beneath said shelf and above said plate, said heat radiating means comprising electrical resistances, an electric circuit for supplying current to said resistances, a thermostat interposed in said electric circuit, and a time controlled switch interposed in said electric circuit.

9. In combination with a dental flask, an oven for containing the dental flask, a heat conduction shelf inside the oven for supporting the dental flask, a heat conduction plate engaging the top of the flask, heat radiating means for said shelf and said plate, said heat radiating means lying beneath said shelf and above said plate, said heat radiating means comprising electrical resistances, an electric circuit for supplying current to said resistances, a thermostat interposed in said electric circuit, a time controlled switch interposed in said electric circuit, and a pilot lamp interposed in said electric circuit.

10. In combination with a dental flask, an oven for containing the dental flask, a heat conduction shelf inside the oven for supporting the dental flask, a heat conduction plate engaging the top of the flask, heat radiating means for said shelf and said plate, said heat radiating means lying beneath said shelf and above said plate, said heat radiating means comprising electrical resistances, an electric circuit for supplying current to said resistances, a thermostat interposed in said electric circuit, a time controlled switch interposed in said electric circuit, a pilot lamp interposed in said electric circuit, and means for adjusting said thermostat to vary the temperature of said heat radiating means.

11. In combination with a sectional flask having means for latching the sections in connected relation, a heating oven for containing the dental flask, a heat conduction shelf inside the chamber for supporting the dental flask, a free heat conduction plate adapted to lie at rest on the dental flask, and means for heating said shelf and plate.

12. An oven for the dry heat curing of artificial dentures comprising a relatively thick first plate fixedly secured inside the oven for supporting a dental flask, a second relatively thick plate adapted to engage the top of the flask, said first and second plates being respectively spaced from the bottom and top of the oven, an electrical heating unit located underneath said first plate, an electrical heating unit located above said second plate, said first and second plates being arranged in heat conducting engagement with the flask, said heating units being arranged in heat radiating relation with their respective first and second plates, and an electric circuit operatively connected with said heating units.

13. An oven for the dry heat curing of artificial dentures comprising a relatively thick first plate fixedly secured inside the oven for supporting a dental flask, a second relatively thick plate adapted to engage the top of the flask, said first and second plates being respectively spaced from the bottom and top of the oven, electrical heating units located underneath said first plate, electrical heating units located above said second plates, said first and second plates being arranged in heat conducting engagement with the flask, said heating units being arranged in heat radiating relation with their respective first and second plates, and an electric circuit operatively connected with said heating units.

14. An oven for the dry heat curing of artificial dentures comprising a relatively thick first plate fixedly secured inside the oven for supporting a dental flask, a second relatively thick plate adapted to engage the top of the flask, said first and second plates being respectively spaced from the bottom and top of the oven, electrical heating units located underneath said first plate, electrical heating units located above said second plates, said first and second plates being arranged in heat conducting engagement with the flask, said heating units being arranged in heat radiating relation with their respective first and second plates, an electric circuit operatively connected with said heating units, said oven having a door providing a wall for the oven, and said plates being spaced from the door.

AVERY H. CHENOWETH.